United States Patent [19]
Dufour et al.

[11] Patent Number: 5,105,028
[45] Date of Patent: Apr. 14, 1992

[54] SEPARATION OF HETERO-ATOM(S) CONTAINING HYDROCARBONS

[75] Inventors: Jacques J. J. Dufour; Laurent Pelsez; Bruno Peltier, all of Grand Couronne, France

[73] Assignee: Shell Oil Company, Houston, Tex.

[21] Appl. No.: 619,791

[22] Filed: Nov. 29, 1990

[30] Foreign Application Priority Data

Dec. 1, 1989 [FR] France .................. 89 15895

[51] Int. Cl.$^5$ .................. C07C 29/48; C07C 27/16
[52] U.S. Cl. .................. 568/840; 568/18; 568/20; 568/30; 568/39; 568/60; 568/66; 568/75; 568/76; 568/860; 568/866; 568/907; 568/910
[58] Field of Search ........... 568/716, 300, 385, 389, 568/800, 802, 803, 860, 18, 30, 38, 120, 30, 39, 66, 75, 76, 866, 907, 910, 840; 534/738, 751; 540/1

[56] References Cited

U.S. PATENT DOCUMENTS 3,497,436  2/1970  Burleson et al. .................. 204/168

FOREIGN PATENT DOCUMENTS 346999   12/1989  European Pat. Off. .
1941378   8/1969  Fed. Rep. of Germany .
2172011   9/1986  United Kingdom .

Primary Examiner—Werren B. Lone

[57] ABSTRACT

Process for preparing one or more hetero-atoms containing hydrocarbons by contacting one or more hydrocarbons with a plasma-generated system derived from a source containing hydrogen atoms(s) and at least one hetero-atom in which process the plasma-generated system in contacted with the hydrocarbon(s) in liquid for and/or in gaseous form under conditions which allow absorption of heat released during the process of preparing said hetero-atom(s) containing hydrocarbons.

18 Claims, 1 Drawing Sheet

SEPARATION OF HETERO-ATOM(S) CONTAINING HYDROCARBONS

FIELD OF THE INVENTION

The present invention relates to the preparation of hetero-atom(s) containing hydrocarbons by using plasma-generated systems.

BACKGROUND OF THE INVENTION

The use of plasma-generated systems, in particular of systems based on argon, hydrogen or methane, has been extensively described in the art. Such systems, when applied to hydrocarbons, are designed for the production of compounds like acetylene and/or carbon black since the energy released by activating the species forming the plasma is such that severe cracking will occur.

The use of hetero-atom(s) containing molecules to produce plasma-systems is much less documented, let alone possible applications thereof. From the rather scarce information available for the use of water as the source of the plasma-system it appears again that a severe cracking of the feedstocks described, such as coal, heavy oils or peat, will be achieved, i.e. in line with the results found for many years when subjecting hydrocarbons to conventional plasmas based on argon, hydrogen or methane.

It has now been found that plasma-generated systems derived from a source containing hydrogen atom(s) and at least one hetero-atom can be suitably applied in the synthesis of hetero-atom(s) containing hydrocarbons without substantially reducing the number of carbon atoms of the starting hydrocarbon(s).

SUMMARY OF THE INVENTION

The present invention thus relates to a process for preparing one or more hetero-atoms containing hydrocarbons by contacting one or more hydrocarbons with a plasma-generated system derived from a source containing hydrogen atom(s) and at least one hetero atom in which process the plasma generated system is contacted with the hydrocarbon(s) in liquid form and/or in gaseous form under conditions which allow absorption of heat released during the process of preparing said hetero-atom(s) containing hydrocarbon(s).

DESCRIPTION OF THE DRAWING

An embodiment of the process according to the present invention is depicted in the sole FIGURE. The apparatus comprises a high voltage generator 1, a vessel 2 and a separating means 4. The source to produce the plasma-generated system is introduced into vessel 2 by means of a tube 3. The discharge to produce the plasma-generated system is sustained between electrode 6A (formed by tube 3) and electrode 6B (in the form of a disc) by means of high voltage generator 1. The electrodes are normally composed of stainless steel. The hydrocarbon(s) to be treated with the plasma-generated system is (are) introduced via one or more tubes 7 (2 tubes being shown but any number of tubes can be used in principle).

DESCRIPTION OF THE INVENTION

Figure 1:
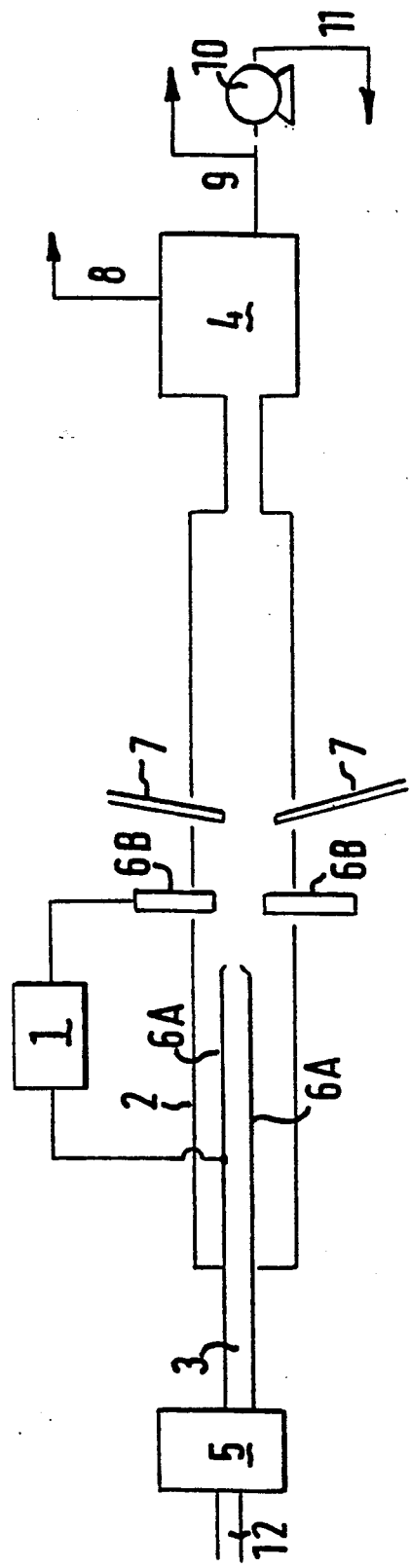

Plasma-generated systems are suitably prepared from hetero-atom(s) and hydrogen atom(s) containing systems wherein the hetero-atoms comprise one or more oxygen, sulphur and/or nitrogen atoms. Examples of oxygen containing sources comprise water and hydroperoxides, in particular water and hydrogen peroxide. Examples of sulphur containing sources comprise hydrogen sulphide and the appropriate alkylsulphides and dialkyl (di) sulphides such as dimethyl disulphide and diethyl disulphide. Examples of nitrogen containing sources comprise ammonia, primary amines and diamines.

Preferred sources to produce plasma-generated systems are sources containing at least one oxygen atom. In particular, preference is given to the use of sources containing water to produce plasma-derived systems. Sources containing a major amount of water are suitable, where major is greater than 50% water. It has been found that lower alkanols can be produced from the corresponding paraffin with a very good selectivity. In particular, methanol can be obtained in a very selective way from methane. It has also been found that phenol can be produced from benzene in good yield and in high selectivity and that hydroxyl-containing derivatives can be produced from toluene.

Mixtures of various hetero-atom(s) and hydrogen atom(s) containing sources may be used but such mixtures do not contribute normally to the selectivity of the process envisaged.

It is also possible to have inert gases such as argon or helium present in the plasma-generated system to be used in the process according to the present invention but they will not substantially influence the process envisaged.

If desired, a hydroperoxide can be used as well to produce the plasma-generated system in particular since hydroperoxides such as hydrogen peroxide are normally available as a solution in water. Hydroperoxides can be present in amounts up to 50% by weight. Good results have been obtained by using up to 30% by weight of hydrogen peroxide in water in the conversion of methane into methanol and of benzene into phenol.

Basically any hydrocarbon which is susceptible to taking part in a reaction with active hetero-atom(s) and hydrogen atom(s) containing system can be used.

Examples of hydrocarbons which can be suitably applied in the process according to the present invention are hydrocarbons containing up to 20 carbon atoms. Preference is given to the use of hydrocarbons containing up to 8 carbon atoms, in particular of paraffinic or aromatic nature. Examples of suitable paraffinic hydrocarbons comprise methane, ethane, propane and (iso)butane. Examples of suitable aromatic hydrocarbons comprise benzene, toluene and the various xylenes.

It has been found that the hetero-atom(s) containing hydrocarbons according to the present invention are produced when care is taken to absorb heat released during the process of preparing said hetero-atom(s) containing hydrocarbons. Good results will normally be obtained when at least 50% of heat released during the process of preparing said hetero-atom(s) containing hydrocarbons is absorbed. Preference is given to processes wherein at least 70%, and in particular 85%, of the heat released is absorbed. It will be clear that the optimum heat control will depend to some extent on the particular process envisaged.

When the hydrocarbon is in the liquid form when contacted with the active hetero-atom(s) and hydrogen atom(s) containing system no additional heat absorbing means will be required since the hydrocarbon can absorb the heat released provided the amount of hydrocarbon used is sufficient from a heat absorbing point of view.

When the hydrocarbon is in the gaseous form (or when the amount of hydrocarbon in liquid form is insufficient from a heat absorbing point of view) it will be necessary to perform the process according to the present invention in the presence of a moiety capable of absorbing a substantial part of the heat released during the process according to the present invention.

Examples of species which can be suitably applied to absorb part or all of the heat released are liquid hydrocarbons (which may be partially converted in heteroatom(s) containing products in the course of the process) and water. Depending on the process conditions, it may be advantageous to use water as the absorbing means for excess heat released, in particular when the source to produce the plasma-generated system is also based on water. By carefully selecting the process conditions high selectives can be achieved.

It is possible to add the heat-absorbing species to the hydrocarbon which is to be converted by the process according to the present invention and then subject the mixture obtained to contact with the plasma-generated system. If desired, the mixture can be subjected to a heat treatment prior to contact with the plasma-generated system.

A plasma is defined for the purpose of this invention as a gaseous medium containing electrical charges which as a whole are at electric neutrality. The type of species present will depend on the nature of the source used to produce the system. For instance, when use is made of water as the source, the plasma-generated system will not only consist of hydrogen atoms and hydroxyl radicals but protons, hydroxyl groups and electrons should also be present, provided electric neutrality is preserved.

The plasma-generated systems to be used in the process according to the present invention are suitably produced by so-called plasma-torches, which are well known as such and used in various branches of industry. Typically, plasma-torches having an energy-production in the range up to 8000 kW can be suitably applied. Preference is given to torches having an energy production in the range between 500 and 3000 kW.

In principle, any means for activating the source(s) to the extent that a plasma-generated system is formed can be used such as electrodeless discharges and appropriate laser beams.

The amount of activated species in the plasma-generated system needed in the process according to the present invention depends to some extent on the scale of the equipment used. In rather small reactors less than 1% of an activated hetero-atom system can already produce remarkable results. In larger reactors, directed at the production of rather large amounts of hetero-atoms containing hydrocarbons, the amount of activated species could well be more than 40%, preferably more than 70%.

The plasma-generated systems can be produced at subatmospheric, atmospheric, as well as at superatmospheric, pressure. When alkanols are to be produced in accordance with the process according to the present invention atmospheric pressure is preferably applied. It is preferred not to use a very low pressure since this would reduce the power density and hence the efficiency in generating the plasma whilst requiring a substantial increase in the volumes needed to carry out the process. Although in principle the use of pressures above e.g. 10 bar is possible, it would require a rather high temperature to reach a sufficiently high concentration of activated species in the plasma-generated system, which would have serious economic disadvantages.

The process according to the present invention can be suitably carried out in a discharge-equipment, optionally provided with recycle means in order to increase the overall yield of the process.

DETAILED DESCRIPTION OF THE DRAWING

An embodiment of the process according to the present invention is depicted in the sole FIGURE. The apparatus comprises a high voltage generator 1, a vessel 2 and a separating means 4. The source to produce the plasma-generated system is introduced into vessel 2 by means of a tube 3. The discharge to produce the plasma-generated system is sustained between electrode 6A (formed by tube 3) and electrode 6B (in the form of a disc) by means of high voltage generator 1. The electrodes are normally composed of stainless steel. The hydrocarbon(s) to be treated with the plasma-generated system is (are) introduced via one or more tubes 7 (2 tubes being shown but any number of tubes can be used in principle).

After the contact between the hydrocarbon(s) and the plasma-generated system has been achieved the resulting mixture containing both hetero-atom(s) containing hydrocarbons and source material is sent, optionally after quenching, to separating unit 4 which may be a distillation equipment or a cooling equipment depending on the source and the hydrocarbon(s) used. Products having a lower boiling point than the source material are removed via line 8 and may be subjected to further upgrading and/or processing if desired. The source material is removed via line 9 and may be recycled via recycle pump 10 and line 11 to line 3. When it is intended to recycle all of the source material line 9 has to be provided with a valve (not shown) which will be closed under full recycle conditions. If desired, part or all of the source material may be subjected to a heat treatment in vessel 5. Also the recycle stream 11 may be sent partially or totally to vessel 5 via line 12.

The plasma-generating equipment is normally operated in such a way that the source material is introduced at atmospheric pressure and has obtained a temperature of about 4500 K when leaving the electrodes.

The ranges and limitations provided in the instant specification and claims are those which are believed to particularly point out and distinctly claim the instant invention. It is, however, understood that other ranges and limitations that perform substantially the same function in substantially the same way to obtain substantially the same result are intended to be within the scope of the instant invention as defined by the instant specification and claims.

EXAMPLES

The invention will be described by the following examples which are provided for illustrative purposes and are not to be construed as limiting the invention.

EXAMPLE 1

An experiment was carried out using part of the equipment as described in the sole FIGURE. Through line 3 steam at atmospheric pressure and at a temperature of 340° C. (obtained by preheating) was sent through a gap between stainless steel electrodes 6A and 6B operated at a voltage of 12.5 kV. The throughput of steam was equivalent to 50 ml $H_2O$/h. Methane was introduced via 3 tubes at a total throughput of 100 ml/minute. The experiment was carried out for a period of 45 minutes. The reaction mixture was led through a cold trap to condense oxygenated material obtained.

Gaschromatographic analysis indicated the production of methanol with a small amount of acetone.

When the experiment was carried out in the absence of methane no products could be isolated.

EXAMPLE 2

The experiment described in Example 1 was repeated using steam at a temperature of 320° C. and a run length of 1 hour. The voltage applied was 15 kV. The reaction mixture was sent through two consecutive cold traps (at ˚ C. and at −78° C., respectively). Again methanol was the main product with only traces of acetone. The yield of methanol was slightly higher.

EXAMPLE 3

An experiment was carried out as described in Example 2 but the steam introduced at 320° C. also contained 10% by volume of hydrogen peroxide. The voltage applied was 14kV. Methane was introduced at a rate of 150 ml/minute. The experiment was carried out for 30 minutes and again methanol was the main product together with a small amount of acetone.

EXAMPLE 4

The experiment described in Example 3 was repeated using steam containing 20% volume of hydrogen peroxide. The yield of methanol was more than doubled.

EXAMPLE 5

An experiment was carried out as described in Example 3 but using benzene as feedstock. The steam applied contained 30% by volume of hydrogen peroxide. The voltage applied was 12.5 kV. The throughput of steam+hydrogen peroxide was equivalent to 50 ml/h. Benzene was introduced via 3 tubes at a total throughput of 10 ml/h. The experiment was carried out for a period of 15 minutes. The reaction mixture was led through a cold trap to condense the reaction effluent.

By gaschromatographic analysis of the composition of the organic materials present in the effluent it was found that 31% of the benzene intake had been converted into phenol with a selectivity well above 90%.

What is claimed is:

1. A process for preparing one or more hetero-atoms containing hydrocarbons selected from the group consisting of alkanols, hydroxyl-containing derivatives, and mixtures thereof by contacting one or more hydrocarbons with a plasma-generated system derived from a source containing hydrogen atom(s) and at least one hetero-atom selected from the group consisting of oxygen, sulphur, nitrogen, and mixtures thereof in which process the plasma-generated system is contacted, at a pressure between atmospheric and 10 bar and wherein the torch has an energy production of between 500 and 8000 kW, with the hydrocarbon(s) in fluid form wherein a liquid selected from the group consisting of liquid hydrocarbons, water, and mixtures thereof, is present during the contacting in a sufficient amount to allow absorption of at least 50% of heat released during the process of preparing said hetero-atom(s) containing hydrocarbon(s).

2. The process according to claim 2, wherein a plasma-generated system is used derived from a source containing at least one oxygen atom.

3. The process according to claim 2, wherein a plasma-generated system is used derived from a source containing a major amount of water.

4. The process according to claim 2, wherein a plasma-generated system is used derived from a source further comprising a hydroperoxide.

5. The process according to claim 4, wherein said source comprises 50% by weight of hydrogen peroxide.

6. The process according to claim 1, wherein at least one of the hydrocarbons contains up to 20 carbons.

7. The process according to claim 6, wherein at least one of the hydrocarbons contains up to 8 carbon atoms.

8. The process according to claim 7, wherein at least one of the hydrocarbons is selected from the group consisting of methane, ethane propane, isobutane, and mixtures thereof.

9. The process according to claim 7, wherein at least one of the hydrocarbons is selected from the group consisting of benzene, toluene, and mixtures thereof.

10. The process according to claim 1, wherein the hydrocarbon(s) are contacted in gaseous form with the plasma-generated system in the presence of a heat-absorbing species wherein at least 50% of heat released during the process of preparing said hetero-atom(s) containing hydrocarbons is absorbed.

11. The process according to claim 1, wherein the hydrocarbon(s) are contacted in gaseous form with the plasma-generated system in the presence of a heat-absorbing species wherein at least 70% of heat released during the process of preparing said hetero-atom(s) containing hydrocarbons is absorbed.

12. The process according to claim 1, wherein the hydrocarbon(s) are contacted in gaseous form with the plasma-generated system in the presence of a heat-absorbing species wherein at least 85% of heat released during the process of preparing said hetero-atom(s) containing hydrocarbons is absorbed.

13. The process according to claim 1, wherein the hydrocarbon(s) are contacted together with water with the plasma-generated system.

14. The process according to claim 13, wherein water is added to the hydrocarbon(s) to be contacted and the mixture obtained is subjected to a heat treatment prior to contact with the plasma-generated system.

15. The process according to claim 1, wherein use is made of a plasma-torch to generate the plasma-generated system from a source containing at least one hetero-atom.

16. The process according to claim 15, wherein use is made of a torch having an energy production within the range of 500-3000 kW.

17. A process for making al alcohol comprising contacting one or more $C_1$-$C_{12}$ hydrocarbon(s) with a plasma-generated system derived from a source containing hydrogen atom(s) and at least one hetero-atom in which process the plasma-generated system is contacted with the hydrocarbon(s) in liquid and/or in gaseous form under conditions which allow absorption of heat released during the process of preparing said hetero-atom(s) containing hydrocarbon(s), wherein at least 70% of heat released during the process of preparing said hetero-atom(s) containing hydrocarbons is absorbed.

18. A process for preparing one or more hetero-atoms containing hydrocarbons by contacting one or more hydrocarbons wherein at least one of which hydrocarbons contains up to 8 carbon atoms with a plasma-generated system derived from a source containing a major amount of water and further comprising a hydroperoxide and hydrogen atom(s) and at least one oxygen atom and wherein use is made of a plasma-torch having an energy production within the range of 500-3000 kW to generate the plasma-generated system from a source containing at least one hetero-atom in which process the plasma-generated system is contacted with the hydrocarbon(s) in liquid and/or in gaseous form under conditions which allow absorption of heat released during the process of preparing said hetero-atom(s) containing hydrocarbon(s), wherein at least 70% of heat released during the process or preparing said hetero-atom(s) containing hydrocarbons is absorbed.

* * * * *